US010496285B1

(12) United States Patent
Jung et al.

(10) Patent No.: US 10,496,285 B1
(45) Date of Patent: Dec. 3, 2019

(54) TECHNIQUES FOR INCREASED I/O PERFORMANCE

(71) Applicant: EMC IP Holding Company LLC, Hopkinton, MA (US)

(72) Inventors: Jaeyoo Jung, Shrewsbury, MA (US); Ramesh Doddaiah, Shrewsbury, MA (US); Owen Martin, Hopedale, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/874,282

(22) Filed: Jan. 18, 2018

(51) Int. Cl.
*G06F 3/06* (2006.01)

(52) U.S. Cl.
CPC .......... *G06F 3/061* (2013.01); *G06F 3/0653* (2013.01); *G06F 3/0659* (2013.01); *G06F 3/0665* (2013.01); *G06F 3/0689* (2013.01)

(58) Field of Classification Search
CPC .............. G06F 3/00; G06F 7/00; G06F 3/061
USPC ............................................................ 710/5
See application file for complete search history.

(56) References Cited

U.S. PATENT DOCUMENTS

| 8,239,584 | B1* | 8/2012 | Rabe | G06F 3/0605 710/8 |
| 9,436,834 | B1* | 9/2016 | Tang | G06F 21/602 |
| 9,684,593 | B1* | 6/2017 | Chen | G06F 12/128 |
| 2005/0021878 | A1* | 1/2005 | Iwatani | G06F 3/0613 710/1 |
| 2010/0281230 | A1* | 11/2010 | Rabii | G06F 3/0605 711/165 |

* cited by examiner

*Primary Examiner* — Getente A Yimer
(74) *Attorney, Agent, or Firm* — Muirhead and Saturnelli, LLC

(57) ABSTRACT

Techniques for processing I/O operations may include: detecting, at a host, a sequence of I/O operations to be sent from the host to a data storage system, wherein each of the I/O operations of the sequence specifies a target address included in a first logical address subrange of a first logical device; sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation; receiving the sequence of I/O operations at the same target port of the data storage system; and processing the sequence of I/O operations.

17 Claims, 11 Drawing Sheets

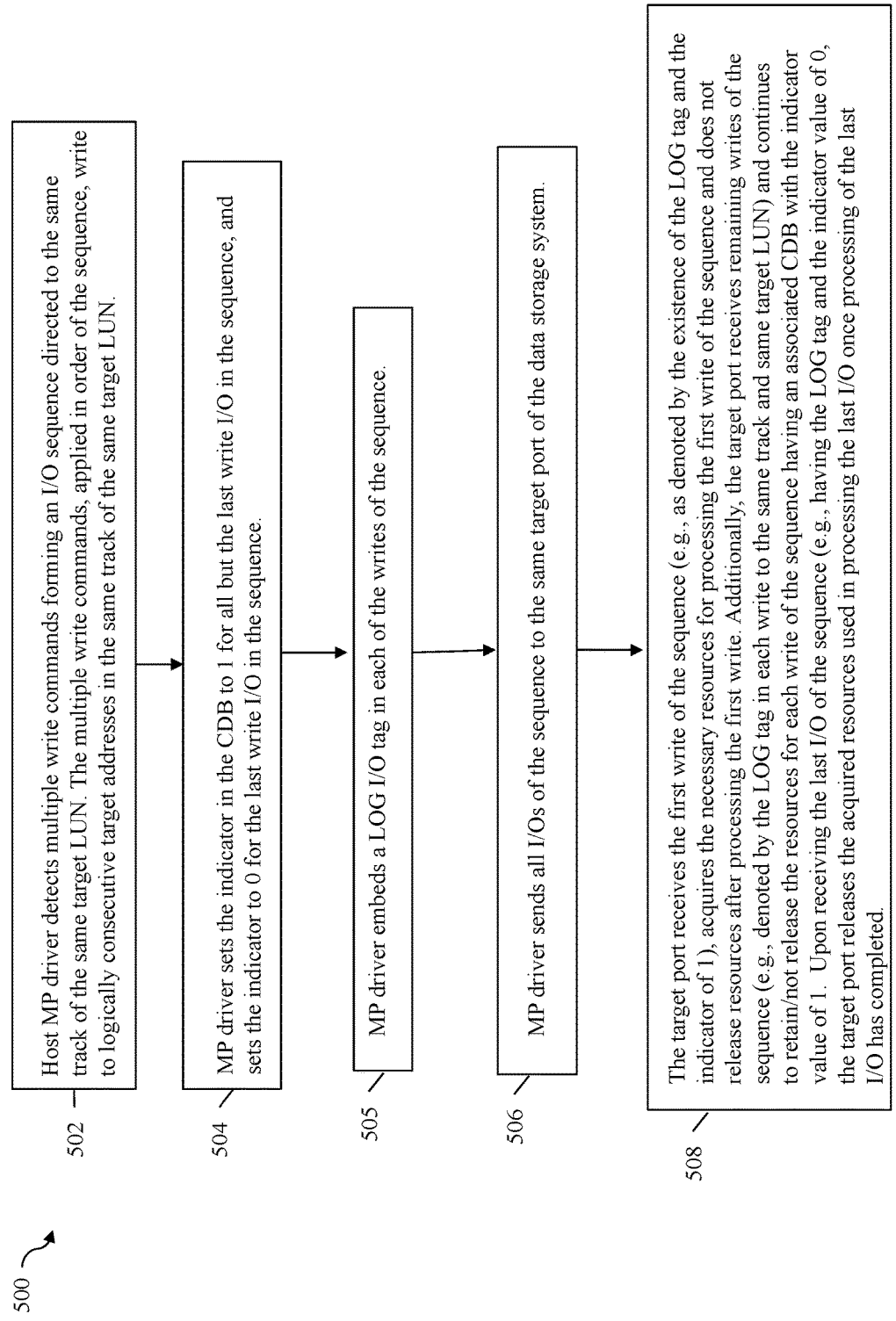

TECHNIQUES FOR INCREASED I/O PERFORMANCE

BACKGROUND

Technical Field

This application generally relates to data storage, and more particularly to techniques used in connection with issuing I/O commands to data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives (or more generally data storage devices or physical storage devices), and disk or storage device interface units. The host systems access the storage device through a plurality of channels provided therewith. Host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of techniques herein is a method of processing I/O operations comprising: detecting, at a host, a sequence of I/O operations to be sent from the host to a data storage system, wherein each of the I/O operations of the sequence specifies a target address included in a first logical address subrange of a first logical device; sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation; receiving the sequence of I/O operations at the same target port of the data storage system; and processing the sequence of I/O operations received at the same target port of the data storage system. A driver of the host may set the indicator in each of the I/O operations of the sequence and wherein the first logical device may be accessible to the host through a plurality of target ports of the data storage system. The same target port may be included as one of the plurality of target ports of the data storage system. The indicator for each of the I/O operations in the sequence other than a last one of the I/O operations of the sequence may indicate to retain and not release resources used by the same target port in connection with processing said each I/O operation subsequent to completing processing of said each I/O operation. The indicator of the last one of the I/O operations of the sequence may indicate to release resources used by the same target port in connection with processing the last one of the I/O operations subsequent to completing processing of the last one of the I/O operations of the sequence. Processing the sequence of I/O operations received at the same target port of the data storage system may include: determining that a first I/O operation of the sequence received at the same target port denotes a start of a new sequence of I/O operations directed to the first logical address subrange of the first logical device, wherein the start of the new sequence of I/O operations is determined when the first I/O operation includes a corresponding indicator that indicates to retain and not release resources used by the same target port in connection with processing the first I/O operation subsequent to completing processing of the first I/O operation, and wherein the first I/O operation is directed to a first target address included in the first logical address subrange of the first logical device and there is currently no detected pending sequence of I/O operations directed to the first logical address subrange of the first logical device. The method may include determining that a last I/O operation of the sequence received at the same target port denotes an end of the new sequence of I/O operations directed to the first logical address subrange of the first logical device, wherein the end of the new sequence of I/O operations is denoted by the last I/O operation including a corresponding indicator that indicates to release resources used by the same target port in connection with processing the last I/O operation subsequent to completing processing of the last I/O operation, and wherein the last I/O operation is directed to a target address included in the first logical address subrange of the first logical device and there is currently a detected pending sequence of I/O operations directed to the first logical address subrange of the first logical device. The first logical address subrange may correspond to a track including a plurality of blocks of data stored on the first logical device. Each I/O operation of the sequence may be a write operation and the sequence of write operations may write to consecutive sequential logical addresses of the first logical address subrange. Each of the write operations of the sequence may include an I/O tag denoting that said each write operation is included in a write sequence of multiple write operations that write to consecutive sequential logical addresses of the first logical address subrange. A driver of the host may set the indicator and the I/O tag in each of the I/O operations of the sequence. The first logical device may be accessible to the host through a plurality of target ports of the data storage system, and the plurality of target ports may include the same target port. The I/O operations of the sequence may not be directed to consecutive sequential logical addresses of the first logical address subrange. The sequence may include at least one read operation and at least one write operation. The sequence may include only write operations. The sequence may include only read operations. The first logical device may include a second logical address subrange of a logical address space of the first logical device, and the first logical address subrange and the second logical address subrange may be contiguous and consecutive logical address subranges of the first logical device. The method may include: issuing, by an application on the host, an I/O operation having a target address range that includes one or more logical addresses of the first logical address subrange and one or more logical addresses of the second logical address subrange; partitioning the I/O operation into a first I/O operation and a second I/O operation, wherein the first I/O operation is directed to the one or more logical addresses of the first logical address subrange and the second I/O operation is directed to the one or more logical addresses of the second logical address subrange, wherein the first I/O operation is included in the sequence of I/O operations; and sending, from the host, a second sequence of I/O operations to a second target port of the data storage system, wherein each of the I/O operations of the second sequence includes an indicator denoting whether resources used by the second target port in connection with processing said each I/O operation are to be released subsequent to completing processing of said each I/O operation, wherein each I/O operation of the second sequence is directed to a target address in the second logical address subrange.

In accordance with another aspect of techniques herein is a system comprising: one or more processors; and a memory comprising code stored thereon that, when executed by at least a first of the one or more processors, performs a method of processing I/O operations comprising: detecting, at a host, a sequence of I/O operations to be sent from the host to a data storage system, wherein each of the I/O operations of the sequence specifies a target address included in a first logical address subrange of a first logical device; sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation; receiving the sequence of I/O operations at the same target port of the data storage system; and processing the sequence of I/O operations In accordance with another aspect of techniques herein is a computer readable medium comprising code stored thereon that, when executed, performs a method of processing I/O operations comprising: detecting, at a host, a sequence of I/O operations to be sent from the host to a data storage system, wherein each of the I/O operations of the sequence specifies a target address included in a first logical address subrange of a first logical device; sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation; receiving the sequence of I/O operations at the same target port of the data storage system; and processing the sequence of I/O operations received at the same target port of the data storage system. A driver of the host may set the indicator in each of the I/O operations of the sequence and wherein the first logical device may be accessible to the host through a plurality of target ports of the data storage system. The same target port may be included as one of the plurality of target ports of the data storage system. The indicator for each of the I/O operations in the sequence other than a last one of the I/O operations of the sequence may indicate to retain and not release resources used by the same target port in connection with processing said each I/O operation subsequent to completing processing of said each I/O operation. The indicator of the last one of the I/O operations of the sequence may indicate to release resources used by the same target port in connection with processing the last one of the I/O operations subsequent to completing processing of the last one of the I/O operations of the sequence. Processing the sequence of I/O operations received at the same target port of the data storage system may include: determining that a first I/O operation of the sequence received at the same target port denotes a start of a new sequence of I/O operations directed to the first logical address subrange of the first logical device, wherein the start of the new sequence of I/O operations is determined when the first I/O operation includes a corresponding indicator that indicates to retain and not release resources used by the same target port in connection with processing the first I/O operation subsequent to completing processing of the first I/O operation, and wherein the first I/O operation is directed to a first target address included in the first logical address subrange of the first logical device and there is currently no detected pending sequence of I/O operations directed to the first logical address subrange of the first logical device; and determining that a last I/O operation of the sequence received at the same target port denotes an end of the new sequence of I/O operations directed to the first logical address subrange of the first logical device, wherein the end of the new sequence of I/O operations is denoted by the last I/O operation including a corresponding indicator that indicates to release resources used by the same target port in connection with processing the last I/O operation subsequent to completing processing of the last I/O operation, and wherein the last I/O operation is directed to a target address included in the first logical address subrange of the first logical device and there is currently a detected pending sequence of I/O operations directed to the first logical address subrange of the first logical device.

BRIEF DESCRIPTION OF THE DRAWINGS

Features and advantages of the present invention will become more apparent from the following detailed description of exemplary embodiments thereof taken in conjunction with the accompanying drawings in which:

FIG. 6B and FIG. 8 are flowcharts of processing steps that may be performed in an embodiment in accordance with techniques herein.

DETAILED DESCRIPTION OF EMBODIMENT(S)

Figure 1:
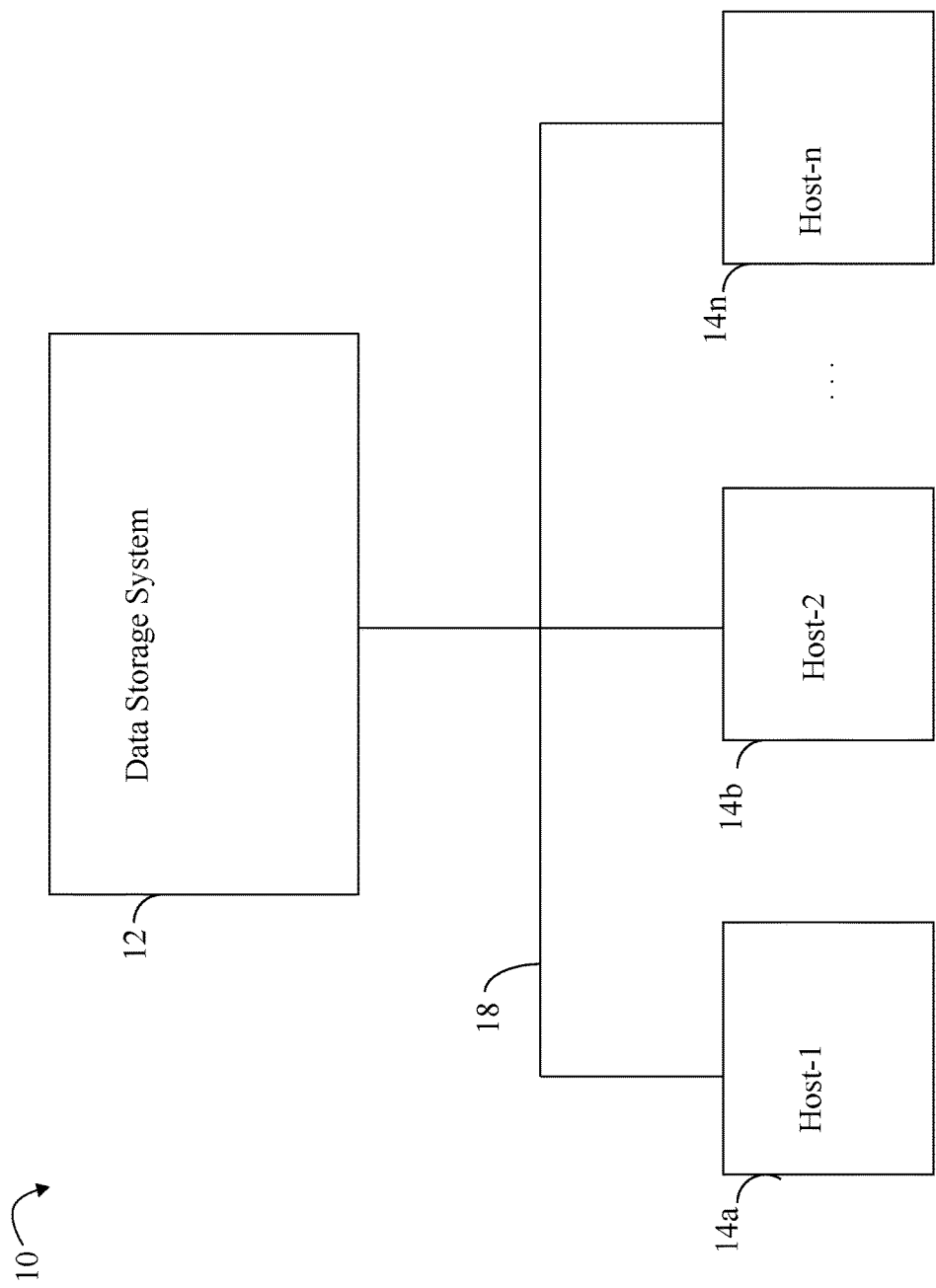
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Symmetrix® VMAX® data storage system by Dell Inc., as well one or more other data storage systems as may vary with the embodiment.

Figure 2A:
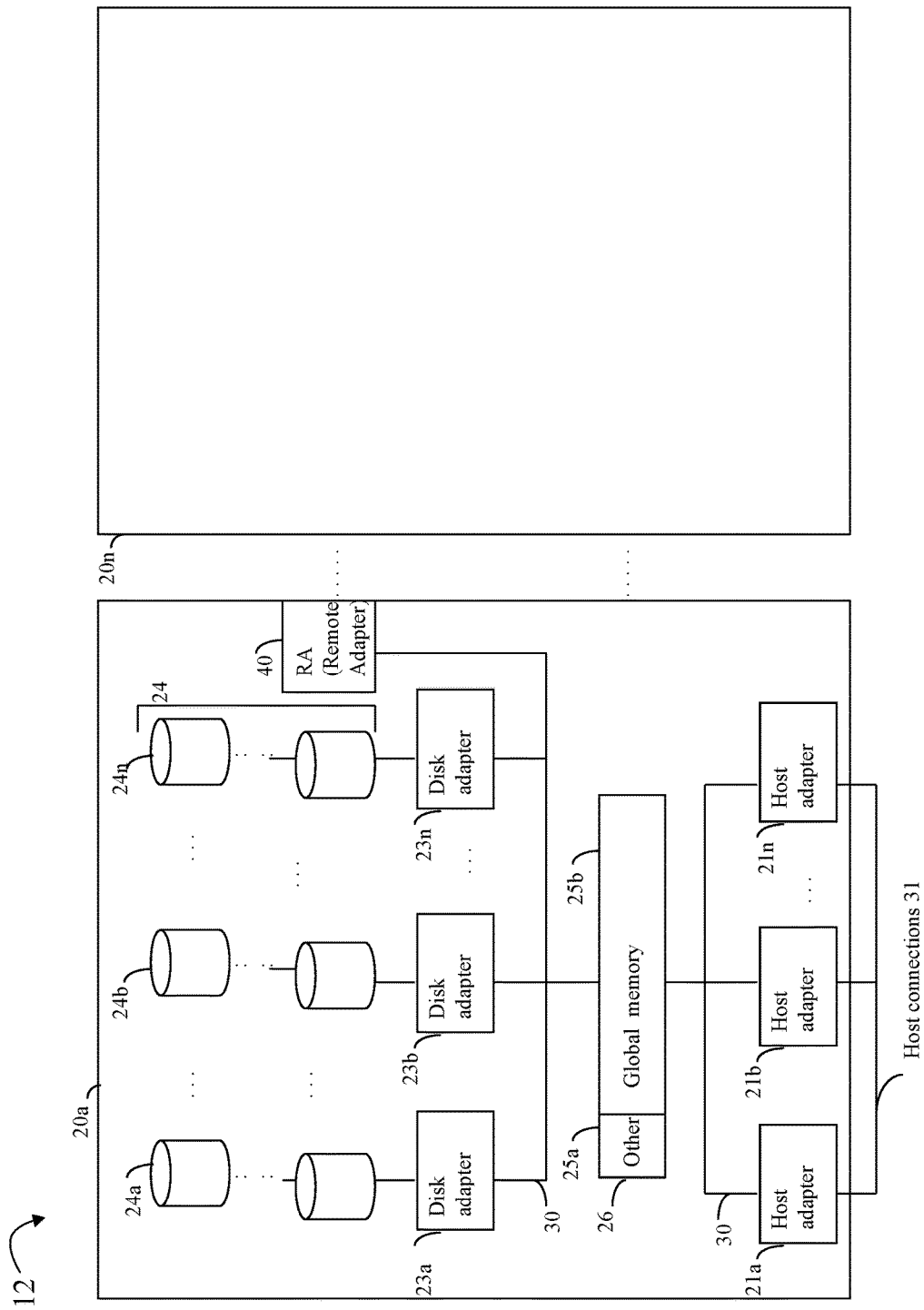
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
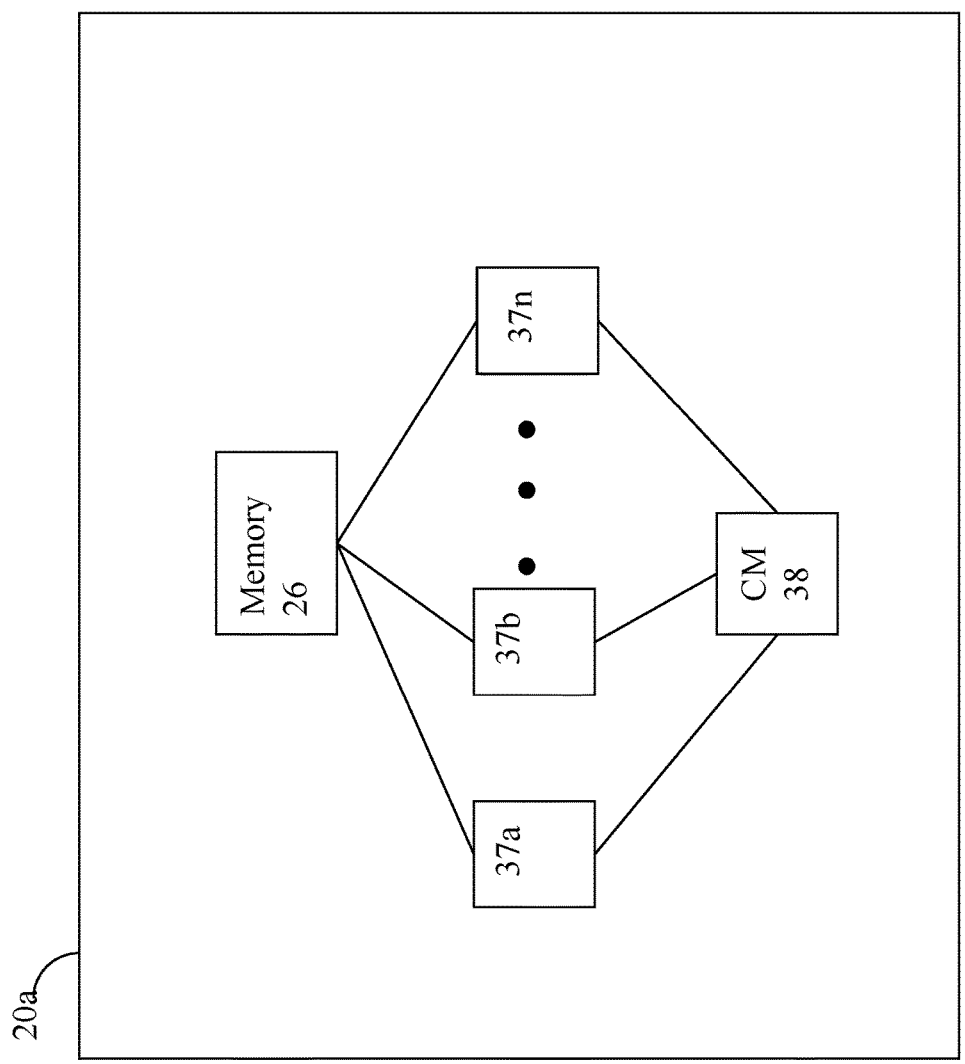
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
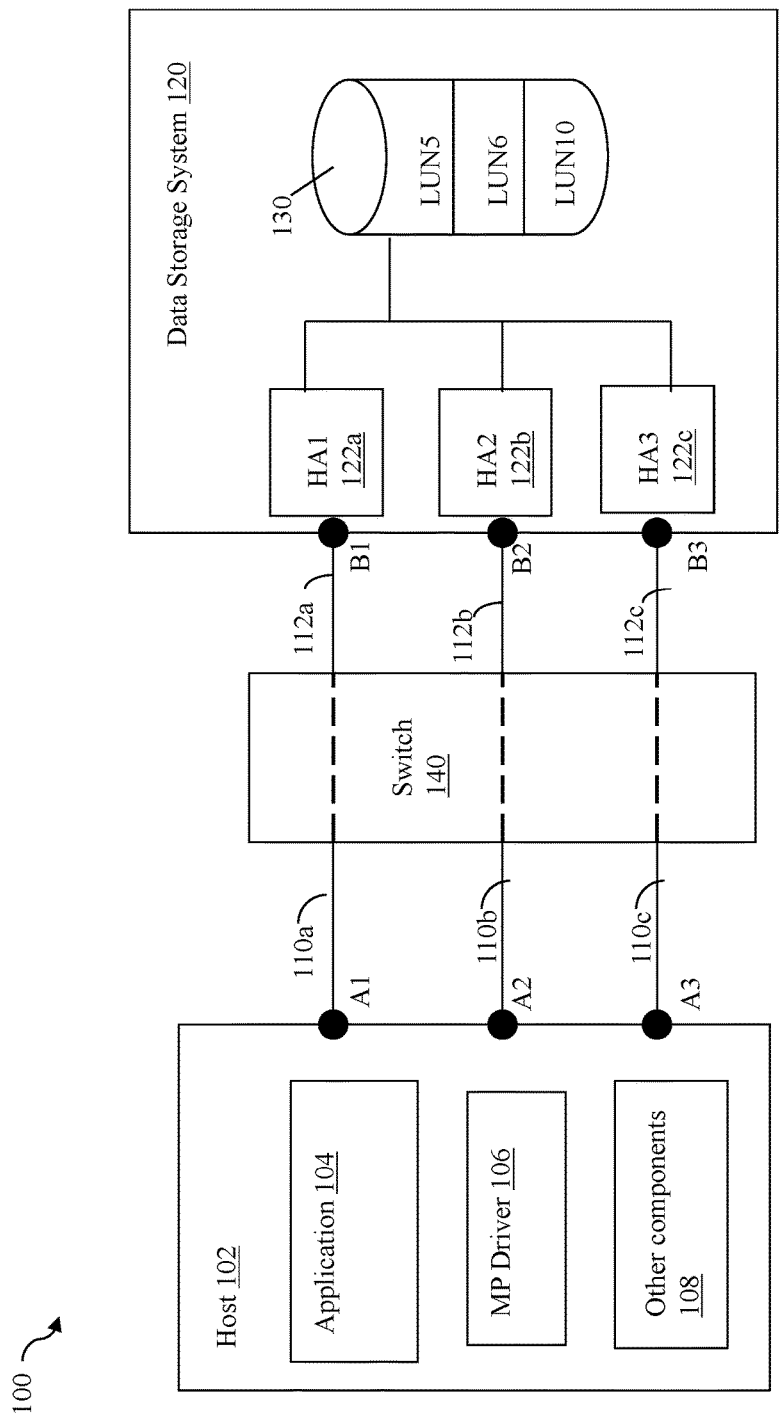
FIG. 3 is an example of a system and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4A:
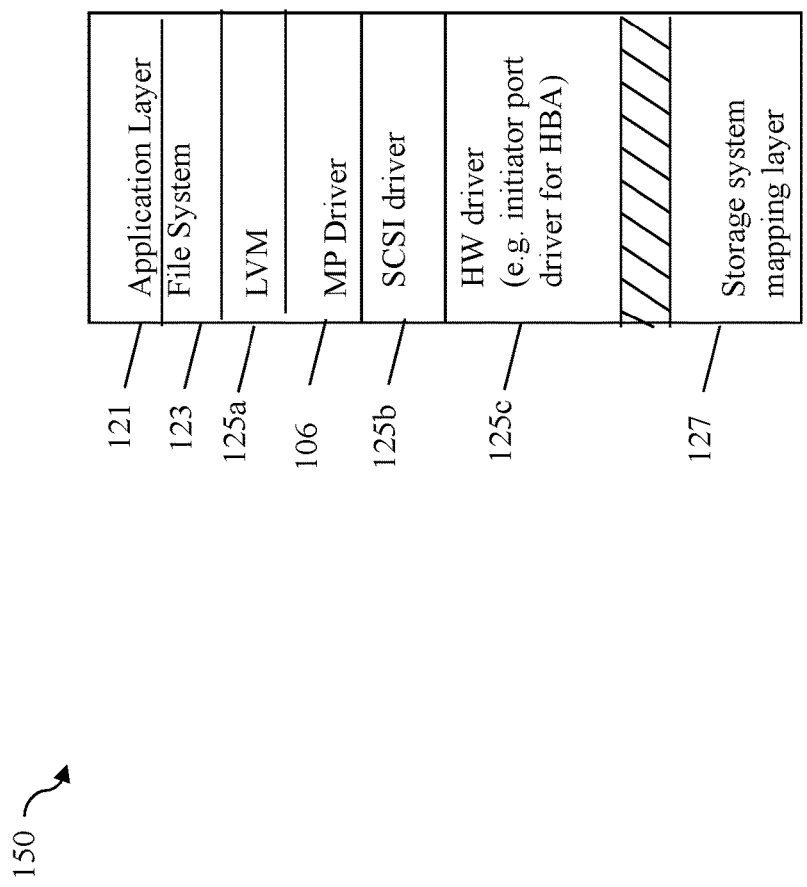
FIG. 4A is an example of different software layers that may be included in a host and data storage system in an embodiment in accordance with techniques herein.

Referring to FIG. 4A, shown is a representation of a number of mapping layers that may be included in a computer system, such as host 102 of FIG. 3, in combination with a data storage system. FIG. 4A provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multi-pathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4A, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In an embodiment of a data storage system in accordance with techniques herein, components such as HAs, DAs, and the like, as discussed herein may be implemented using one or more "cores" or processors each having their own memory used for communication between the different front end and back end components rather than utilize a global memory accessible to all storage processors.

Although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address. Generally, information for each LBA or track of a LUN may have associated metadata (MD) also sometimes referred to herein as per-track MD or track MD. The track MD may include data or information about a single track of data stored on a LUN. The track MD may include, for example, the physical storage location on one or more PDs 24 where data for the particular track is stored.

Figure 4B:
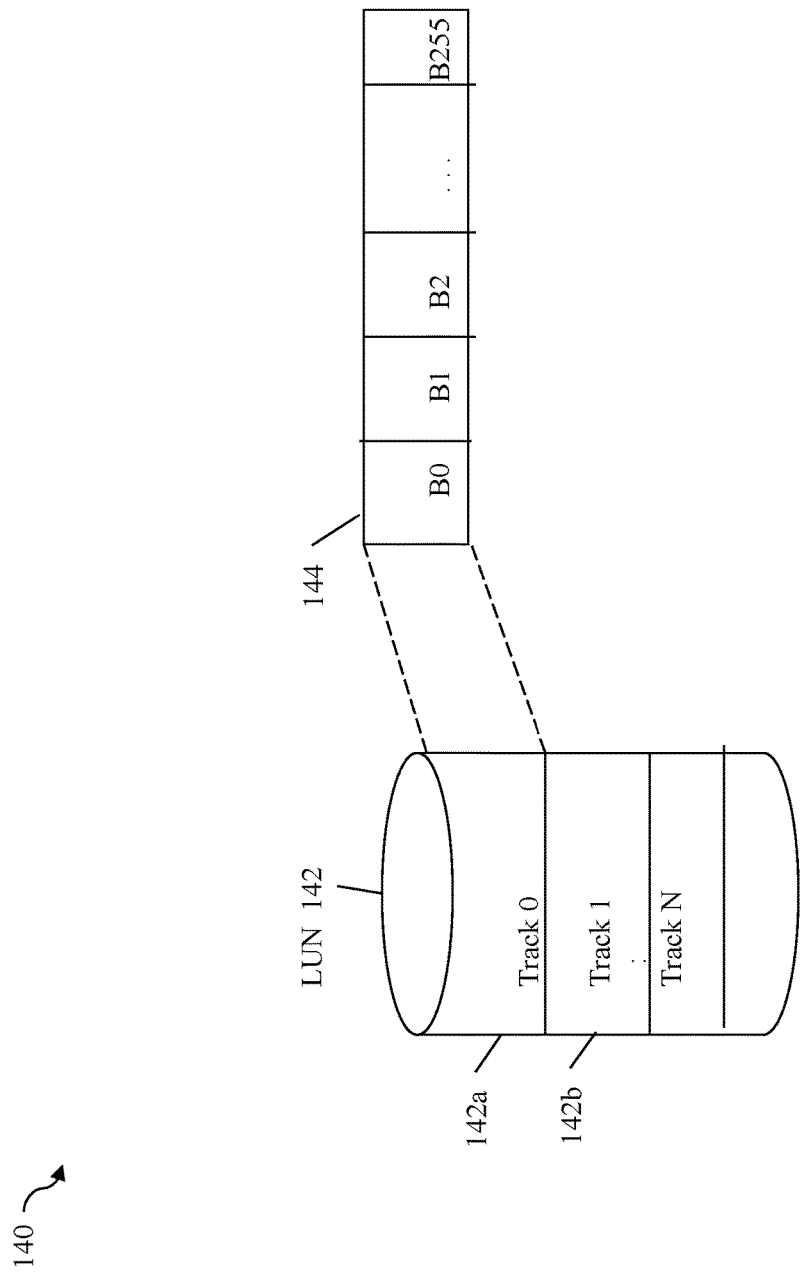
FIG. 4B is an example illustrating logical tracks and blocks of a logical device in an embodiment in accordance with techniques herein.

In at least one embodiment, the maximum data or payload size of a host I/O may be a single track of 128 KB. In such an embodiment, the block size may be 512 bytes and the maximum number of 512 byte data blocks of a single write I/O operation (maximum number of write data blocks or payload) is 256. Thus, an embodiment may allocate suitable buffers, other memory, and structures for use with techniques herein to accommodate the maximum number of 256 blocks (e.g., 256 512-byte data blocks and associated metadata). In such an embodiment, the target logical address of an I/O command or operation may denote the LUN and also the LBA corresponding to a logical address of a particular logical data block. To further illustrate with reference to the example 140 of FIG. 4B, in at least one embodiment, the logical address space of a LUN 142 maybe partitioned into logically contiguous tracks, such as the N tracks of 142, where each of the N tracks of LUN may correspond to a different group of 256 logically contiguous blocks. For example, as illustrated by 144, track 0 142a may include the first 256 logically contiguous blocks of data (e.g., LBA 0 through 255) of the LUN 142. In a similar manner, track 1 142b may include the next 256 logically contiguous blocks of data (e.g., LBAs 256-511) of the LUN 142, and so on, for subsequent remaining ones of the N tracks of the LUN 142. The I/O operation, such as a read or write operation, may identify a target logical address that is a combination of the particular LUN and one or more target LBAs or blocks to which the I/O operation is directed (e.g., the I/O operation may read or write one or more blocks of data). The I/O operation may indicate the target logical address in any suitable manner in the I/O operation, such as using a starting LBA and a size or length (whereby the I/O operation has an ending logical address/LBA computed by adding the size or length, minus 1, to the starting LBA).

In a data storage system with multiple target ports and multiple HAs, there may be resources allocated and used individually by each of the multiple target ports such as in connection with processing received I/O operations. In connection with shared resources, locks may be used to ensure that different target ports of the data storage system lock resources as needed, such as lock LUN tracks so that no 2 target ports have simultaneous write access to same track/location of LUN. A LUN may be characterized as a shared resource where each of the different data portions, such as each track of the LUN, may be accessed for read and/or write by multiple HA ports in connection with processing received I/O operations. As such, techniques known in the art may be used to synchronize and control access to such shared resources, and portions thereof. For example, in at least one embodiment, locks may be used to control and synchronize access to a shared resource, where each track of a LUN may be associated with a different lock used to control access to the particular track. For example, in at least one embodiment, prior to a component or process writing data of a write I/O directed to a particular track of a LUN, the component or process must first obtain the lock for exclusive access to the particular track. If another component or process already holds a lock for the particular track of the write I/O, the component or process may be blocked from performing the write I/O until the required exclusive access lock is obtained for the particular track to be written. Thus, the per-track lock may provide exclusive access of the track, at a particular point in time, to the component or process that holds the lock at the particular point in time.

In connection with an embodiment such as described in connection with FIGS. 3 and 4, multi-pathing may be used to provide access to the same LUN through multiple HAs (and multiple HA target ports) of the data storage system. As described in connection with FIG. 3, for example, LUN 5 on the data storage system 120 may be accessible by the host 102 through 3 different paths (e.g., A1-B1, A2-B2 and A3-B3) whereby for each particular I/O operation (e.g., read and/or write) directed to LUN 5, the MP driver 106 may select any one of the 3 configured and available paths to different HA ports for sending the I/O to the data storage system.

For example, a first HA port may receive a first write that writes first data to track X of LUN 5 and a second HA port may receive a second write that writes second data to the same track X of the LUN 5. The first HA port may receive the first write for processing and obtain a lock for the track X of LUN 5. The lock may exclude all other HA ports or other components from accessing the track X of LUN 5 for I/O processing while the first HA port holds the lock for track X of LUN 5. For example, while the first HA port holds the lock for track X of LUN 5, the second HA port may receive the second write to write second data to the same track X of the LUN 5. However, while the first HA port holds the lock for track X of LUN 5, the second HA port is not able to service or process the second write since the second HA port must first obtain the lock for the track X of LUN 5. Thus, the per-track lock for a write command may provide exclusive access of the LUN track of data to the lock holder or owner, such as the HA port that received the write command.

More generally, the HA port receiving the I/O command, such as the write command, may also need other resources in connection with servicing the I/O command. For example, such other resources may include per-track MD (metadata) located in GM to process the write I/O command for the track. The per-track MD for a track of a LUN may include, for example, information regarding the provisioned back-end physical storage location allocated and mapped to the LUN track, as well as other MD for the particular track. The resources used by the HA port in processing an I/O command may also include storage or memory, such as for temporarily storing write data in a write buffer allocated from memory. In at least one embodiment in accordance with techniques herein, locks may be used in connection with providing desired synchronization and exclusive access to such resources used by the HA port in processing the I/O command.

For an I/O operation or command, such as a write command received by an HA port of the data storage system, the HA port may obtain required resources prior to servicing or processing the write command. Such resources may be obtained by acquiring one or more locks of such resources (e.g., obtain lock for exclusive access to LUN track of data written to by write command, obtain lock for exclusive access to required write storage buffer, obtain lock for exclusive access to required track MD stored in GM, lock to cache slot including write data), whereby such locks may provide the current lock holder or owner HA port with the needed exclusive access to such resources for use in processing the write or other I/O command.

With reference back to FIGS. 3 and 4, the MP driver 106 of host 102 may select a particular one of the 3 multiple paths over which to send the write command to the data storage system 120. For example, the MP driver 106 may send a first write command, that writes to a first LBA located in track X of LUN 5, over a first path A1-B1 to HA1. To service the first write command, target port B1 of HA1 may obtain the needed resources such as by acquiring required locks of such resources. For example, target port B1 of HA1 may obtain locks for exclusive access to LUN5, track X data; exclusive access to the track MD for LUN5, track X, and other resources. Target port B1 of HA1 may perform processing to service the first write including storing the first write data in cache (to be destaged to physical storage a later point in time) and then returning an acknowledgement to the host. Subsequently, the target port B1 of HA1 may release the resources held in connection with servicing the first write command (e.g., by releasing the locks on the resources).

A second write command may be sent by the MP driver 106 from the host 102 to the data storage system 120. The second write command may also write data to LUN 5, track X. The second write command may write data to a second LBA (e.g., different than the first LBA of the first write) also located in track X of LUN 5. In accordance with an embodiment not using techniques herein, the MP driver 106 may use, for example, a round robin or other path selection technique to select a particular one of the 3 paths over which to send the second write, where the selected path is different than first path A1-B1 over which the prior above-noted first write was sent. For example, the MP driver 106 may select a second path A2-B2 over which the second write to LUN 5 track X is sent to target port B2 of HA2. In this case, the target port B2 of HA2 performs processing similar to that as described above by target port B1 of HA1. To service the second write command, target port B2 of HA2 may obtain the needed resources such as by acquiring required locks of such resources. For example, target port B2 of HA2 may obtain locks for exclusive access to LUN5, track X data; exclusive access to the track MD for LUN5, track X, and other resources. Target port B2 of HA2 may perform processing to service the second write whereby the second write data is stored in cache (to be destaged to physical storage a later point in time) and then an acknowledgement is returned to the host. Subsequently, the target port B2 of HA2 may release the resources held in connection with servicing the first write command (e.g., by releasing the locks on the resources).

The foregoing where I/O commands directed to the same LUN track are sent to different target ports of the data storage system may be characterized as inefficient. For example, target port B1 of HA1 performs processing to release a set of resources used for processing the first write, and then target port B2 of HA2 performs processing in connection with the second write command whereby B2 may acquire and use at least some of the same set of resources previously used by B1 (e.g., acquire the same exclusive access lock to track X, LUN 5 data; acquire the same exclusive access lock to track MD for track X, LUN 5; acquire and lock cache location storing write data).

As an improvement to the foregoing in at least one embodiment in accordance with techniques herein, the MP driver 106 may use a path selection technique which includes detecting which I/O operations are directed to the same track, or more generally, same logical address subrange of the same LUN. For example, I/Os sent from any one or more of the different host initiators (e.g., A1, A2 and A3 of FIG. 3) may be stored in queues on the host where the MP driver 106 may search the queues for I/Os directed to (e.g., having target logical addresses located in) the same track of the same LUN, and then send such I/Os to the same target port of the HA (e.g., front end director or adapter) of the data storage system.

Figure 5:
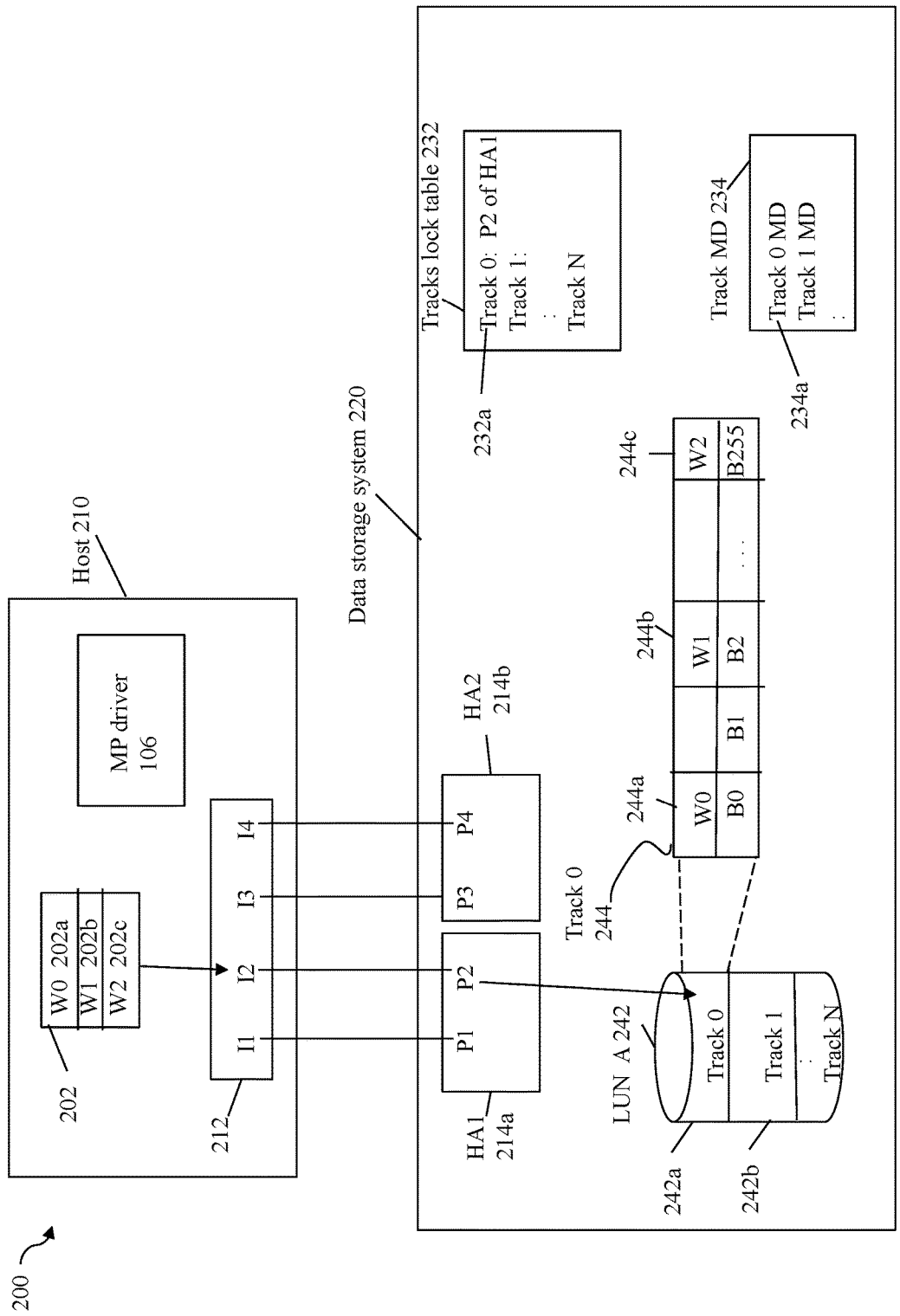
FIG. 5 is an example of components that may be included in a system in an embodiment in accordance with techniques herein.

Referring to FIG. 5, shown is an example further illustrating use of techniques herein as discussed above where the MP driver 106 may send I/Os, that have a target location in the same track of the same LUN, to the same target port of the data storage system. The example 200 includes host 210 and data storage system 220 similar, respectively, to hosts and data storage systems described in connection with other figures. For simplicity, host 210 and 220 are illustrated as only including some components as described elsewhere herein. The host 210 includes MP driver 106 and 4 initiators, such as HBA ports, 212—I1, I2, I3 and I4.

The data storage system 220 includes HA1 214a with target ports P1 and P2, and HA2 214b with target ports P3 and P4. In the example 220, 4 paths are defined over which LUN A 242 may be accessed and over which I/Os to LUN A 242 may be issued from the host 210. Element 214a-b may be front end directors of the data storage system 220 (e.g., similar to HAs as described in connection with other figures herein). The 4 paths are identified in the example 200 between an initiator of the host (e.g., one of the initiators 212) and a target port of the data storage system (e.g., one of the ports P1, P2, P3 and P4 of 220). The 4 paths are: I1-P1 (path 1); I2-P2 (path 2); I3-P3 (path 3); and I4-P4 (path 4).

Element 242 is a representation of the N tracks of logical addresses of LUN A. Element 242 is similar, for example, to 142 of FIG. 4B. In particular, element 242a denotes track 0 of LUN A and element 242b denotes track 1 of LUN A. Element 244 provides additional detail regarding the 256 logically contiguous blocks (e.g., LBAs 0-255) forming track 0 242a. Element 244 is similar, for example, to 144 of FIG. 4B.

Element 202 of the host 210 denotes 3 pending write operations 202a-c which are included in one or more queues of the host 210 waiting to be sent to the data storage system for processing. The MP driver 106 may detect that 3 write operations 202a-c all write to target locations included in the same track 0 of the same LUN A. For example, the MP driver 106 may receive I/O operations directed to LUN A 242 in addition to those 3 writes of 202. The MP driver 106 may search such received I/O operations to determine and select a specified number of I/O operations having a target address or location in the same track of the same LUN. In this example, the MP driver 106 may determine that 3 I/O operations 202a-c have target addresses (e.g., write data) in track 0 242a of LUN A 242. In this example, write W0 202a is illustrated by 244a as writing a single block of data to LBA 0 of LUN A; write W1 202b is illustrated by 244b as writing a single block of data to LBA 2 of LUN A; and write W2 is illustrated by 244c as writing a single block of data to LBA 255 of LUN A. In this example, the MP driver 106 detects that the write I/Os 202a-c are all directed to the same track 0 of LUN A 242 and selects to send the write I/Os 202a-c over path 2, I2-P2 (as illustrated in FIG. 5).

In such an embodiment, the MP driver 106 may embed an indicator in command data blocks (CDBs) of each of the 3 write I/Os sent from the host 210 to the data storage system 220. The indicator may denote to the receiving target port of the data storage system whether or not to release any resources acquired in connection with processing the I/O described by the CDB. In connection with the 3 write I/Os, assume they are processed and sent by the MP driver 106 to the data storage system 220 in the following sequential order: 202a, 202b, 202c. In the series or sequence of 3 write I/Os 202a-c, the MP driver 106 sets the indicator in the CDB for the first write 202a and the CDB for the second write 202b to denote that the receiving target port P2 should not release resources acquired in connection with processing the writes 202a-202b. For the last write I/O 202c of the series or sequence, the MP driver 106 sets the indicator in the CDB for the third write 202c to denote that the receiving target port P2 should release resources used in connection with processing the write 202c after processing for the write 202c has completed (e.g., after acknowledgment is sent to the host regarding completion of the write 202c). In this manner, the target port P2 does not have to release and then reacquire the necessary resources for I/Os in the series or sequence once such resources have been acquired in connection with the first write 202a of the series or sequence. The target port P2 may release the resources acquired in connection with the first write 202*a* after it has completed processing for the last I/O in the series or sequence of writes (e.g., after the third write 202*c*).

Element 232 denotes the tracks lock table including a lock for each of the N tracks of LUN A 242. As indicated by 232*a*, the target port P2 of HA1 214*a* has acquired the lock for data track 0 of LUN A 242. In connection with at least one embodiment in accordance with techniques herein, a lock, such as the per data track lock for a LUN as denoted by 232*a*, may include having the current owner of the track lock write an identifier in an entry of the table 232. For example, 232*a* may denote the entry of the table 232 associated with the lock information for track 0 of LUN A 242. When a target port acquires the lock for track 0 of LUN A 242, the target port P2 writes its corresponding identifier into entry 232*a* indicating target port P2 is the current owner of the lock for track 0. Additionally, other information may also be recorded in the entry 232*a*, such as a timestamp denoting the date and time at which the indicated current owner P2 acquired the lock for track 0.

In at least one embodiment, a lock acquired for a resource, such as for each track of data, may be held for no longer than a maximum amount of time. For example, assume that P2 is the current owner of the lock for track 0 of LUNA 242 as denoted by 232*a*. While P2 holds the lock for track 0, another component or process, such as another target port P3, may attempt to acquire the lock for track 0. In connection with such processing, target port P3 may check to see whether the current lock owner or holder P2 has held the lock for track 0 longer than the maximum amount of allowable time (e.g., determine whether the difference between the current time and the time stamp associated with the lock acquisition exceeds the maximum allowable amount of time). If so, the lock held by P2 may be forcibly released or unlocked. The foregoing may be used to handle a variety of circumstances and states that may arise in an embodiment. For example, it may be that P2 goes offline or is otherwise experiencing an error state that occurred prior to completing processing an I/O operation and prior to releasing the lock for track 0 of LUN A. In such a case, the lock for track 0 may be forcibly released or unlocked such as in connection with a subsequent target port attempting to acquire the track 0 lock. Additionally, an embodiment may have a scrubber background process that periodically executes to forcibly release any locks which have been held by a current owner for longer than the maximum allowable amount of time.

Element 234 denotes the per track MD for each track of LUN A 242. Consistent with discussion elsewhere herein, the track MD 234 may be stored, for example, in global memory of the data storage system 220. Additionally, as may be needed, a lock may be acquired for accessing and performing any needed processing of track MD 234*a* for track 0 of LUN A 242.

Figure 6A:
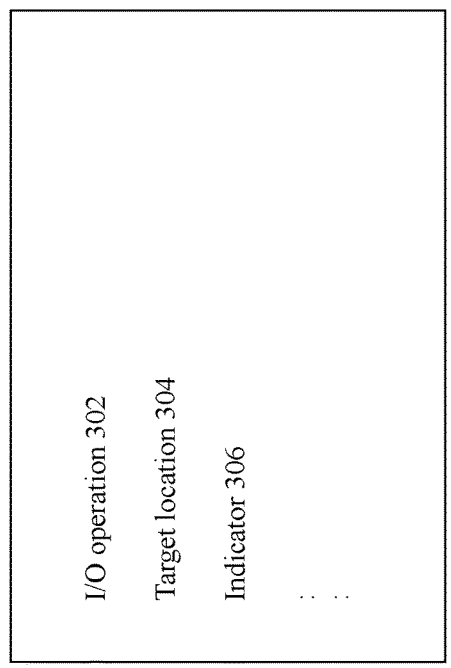
FIG. 6A is an example of a command data block (CDB) for an I/O operation that may be used in an embodiment in accordance with techniques herein.

Referring to FIG. 6A, shown is an example of information that may be included in a CDB for an I/O operation in an embodiment in accordance with techniques herein. The CDB 300 may be initialized to include desired values by the I/O driver 106 where the CDB denotes a corresponding I/O operation and is then sent over the selected path. The CDB may include an I/O operation field 302 denoting whether the I/O operation is a read, write or other command. The CDB may include target location 304 identifying the target location of the I/O operation. As described elsewhere herein, the target location 304 may identify a target LUN and one or more logical addresses (e.g., LBAs) in the target LUN's address space to which the I/O operation is directed. The CDB may also include indicate 306 which denotes to the target port of the data storage system receiving the CDB whether the target port should release or otherwise hold onto resources acquired in connection with processing the I/O operation after the I/O operation has been processed. The CDB 300 may also include other information describing the I/O operation.

The indicator 306 may be implemented using any suitable number of one or more suitable bits to denote desired I/Os in the sequence. In at least one embodiment, the indicator 306 may be implemented using a single bit having an appropriate bit value of 0 or 1 as determined and set by the MP driver 106. With a single bit indicator, the MP driver 106 sets the indicator 306 to 1 to denote that, after servicing the I/O operation, the receiving target port of the data storage system should not release/should retain resources acquired and used in connection with processing the I/O operation. In this manner, the target port has already acquired and retains such resources for use in processing subsequently sent I/Os of the series or sequence of I/Os directed to the same track on the same LUN. For I/Os in the series or sequence of I/Os directed to the same track of the same LUN, the MP driver 106 sets the indicator 306 to 1 for all I/Os of the series or sequence except for the last I/O in the series or sequence.

With the single bit indicator, the MP driver 106 sets the indicator 306 to 0 to denote that, after servicing the I/O operation, the receiving target port of the data storage system should release/should not retain resources acquired and used in connection with processing the I/O operation. For I/Os in the series or sequence of I/Os directed to the same track of the same LUN, the MP driver 106 sets the indicator 306 to 0 for only the last I/O in the series or sequence. In this manner, the target port releases the resources after completing processing for the last I/O of the series or sequence of I/Os directed to the same track on the same LUN.

It should be noted that the techniques described may be applied generally to any I/Os (including both reads and writes as long as the target address of the I/O commands of the same sequence or series of I/O operations are all located in the same track of the same LUN. As a variation, an embodiment may selectively apply such techniques for use only with writes operations, or only with read operations. In other words, a single sequence of I/O operations may include exclusively only write I/Os directed to the same track of the same LUN. As another example, a single sequence of I/O operations forming the sequence may include exclusively only read I/Os directed to the same track of the same LUN.

Additionally, although the same track is used as the target region, portion or subrange of the target LUN logical address space, more generally, techniques herein may be used in connection with any suitable subrange or portion of contiguous logical addresses of the LUN logical address space in accordance with the level of granularity associated with locks or synchronization of LUN data and resources on the data storage system.

In connection with examples set forth above (e.g. FIG. 5), each of the I/Os of the sequence or series may denote target location within a single same track. As a variation, a single one of the I/O operations may span across multiple tracks of the same target LUN. For example, a write I/O may write data to a target location that includes multiple LBAs spanning two logically consecutive tracks of LUN A 242. For example, a write may write data to LBAs 255, 256 and 257 where LBA 255 is located in track 0 and LBAs 256 and 257 are located in track 1. In such a case, the MP driver may perform processing to partition the single host I/O into two I/Os, a first I/O that writes to LBA 255 of track 0 and a second I/O that writes to LBAs 256 and 257 of track 1. In this manner, the MP driver may include the first I/O in one sequence or series of I/O operations directed to track 0 of LUN A 242, and include the second I/O in a second sequence or series of I/O operations directed to track 1 of LUN A 242.

In at least one embodiment in accordance with techniques herein, the target port of the data storage system receiving the sequence or series of I/Os may examine the information in the CDBs of the I/Os to detect the start of a new sequence or series of I/Os directed to the same track of the same LUN, detect the last I/O of a sequence or series of I/Os directed to the same track of the same LUN, and detect any I/Os of the sequence or series between (e.g., in the middle of) the first and last I/O of the sequence or series. In at least one embodiment, the target port may determine that a first I/O operation received denotes the start of a new sequence of I/O operations directed to a track of a LUN. The start of the new sequence of I/O operations may be determined when the first I/O operation includes a corresponding indicator that indicates to retain and not release resources used by the target port in connection with processing the first I/O operation subsequent to completing processing of the first I/O operation, and when the first I/O operation is also directed to a target address included in a track of a LUN and there is currently no detected pending sequence of I/O operations directed to the that particular track of the LUN. Once the first or starting I/O operation of a new sequence has been detected, I/Os in the middle of the sequence (between the first and last I/Os of the sequence) may be determined as included in an existing detected sequence directed to the same track of the same LUN as the first I/O of the sequence since I/Os in the middle of the sequence each have a corresponding indicator that indicates to retain and not release resources used by the target port in connection with processing the I/O operation. In at least one embodiment, a last I/O operation of the sequence received at the target port may denote an end of an existing sequence of I/O operations. In at least one embodiment, the last I/O operation of a sequence may be detected when the I/O operation has a target address in the same track on the same LUN matching those of the first I/O operation of the detected sequence. Additionally, the last I/O operation of the sequence may include a corresponding indicator that indicates to release resources used by the target port in connection with processing the last I/O operation subsequent to completing processing of the last I/O operation.

Figure 6B:
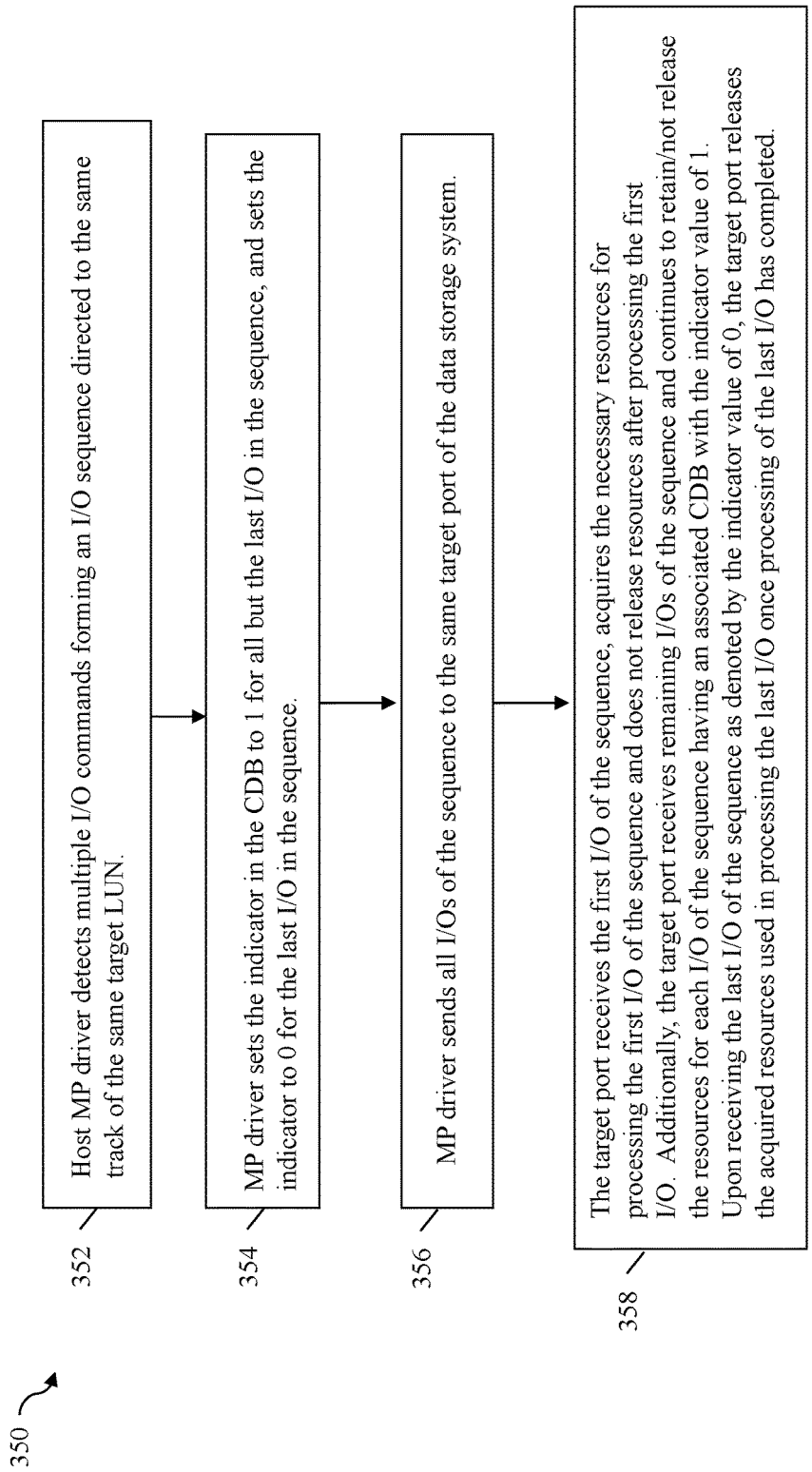

Referring to FIG. 6B, shown is a flowchart summarizing processing that may be performed in an embodiment in accordance with techniques herein. The flowchart 350 summarizes processing as just described above, such as in connection with FIGS. 5 and 6. At step 352, the host MP driver detects multiple I/O commands forming an I/O sequence directed to the same track of the same target LUN. From step 252, processing proceeds to step 354. At step 354, the MP driver sets the indicator in the CDB to 1 for all but the last I/O in the sequence, and sets the indicator to 0 for the last I/O in the sequence. From step 354, control proceeds to step 356. At step 356, the MP driver sends all I/Os of the sequence to the same target port of the data storage system. From step 356, processing proceeds to step 358. At step 358, the target port receives the first I/O of the sequence, acquires the necessary resources for processing the first I/O of the sequence and does not release such resources after processing the first I/O. The first I/O of a particular sequence may be determined by having the target port detect that the CDB of the first I/O operation has an indicator value of 1 and the first I/O operation is directed to a target track of a target LUN. In this manner, the target port may store state information indicating an open or pending I/O sequence directed to the target track of the target LUN specified in the first I/O operation. Additionally, the target port receives remaining I/Os of the sequence (e.g., directed to the same target track and target LUN as the first I/O) and continues to retain/not release the resources for each I/O of the sequence having an associated CDB with the indicator value of 1. Upon receiving the last I/O of the sequence (e.g., directed to the same target track and LUN as the first I/O) as denoted by the indicator value of 0, the target port releases the acquired resources used in processing the last I/O once processing of the last I/O has completed. In connection with step 358, it should be noted that although the target port may not explicitly release resources acquired in connection with processing an I/O of the sequence having the indicator value of 1, prior to servicing the next I/O of the sequence, the target port may verify/ensure that it still has all necessary required resources for servicing the next I/O. The foregoing may be performed since a needed resource may have been relinquished forcibly from the target port or through other means that may vary with embodiment.

Figure 7:
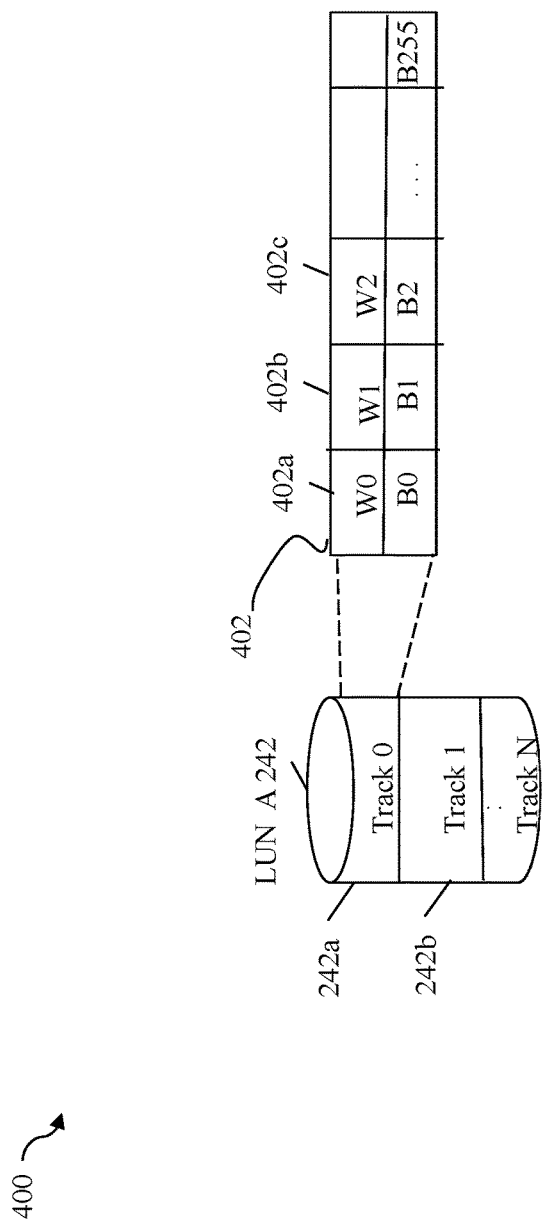
FIG. 7 is an example illustrating write commands of a sequence in an embodiment in accordance with techniques herein.

In connection with the example illustrated in FIG. 5, it should be noted that the MP driver 106 may perform processing to generally detect multiple I/Os directed to the same target track of the same target LUN, whereby the MP driver 106 sends the multiple I/Os forming the I/O series or sequence to the same target port of the data storage system. In the example 200 of FIG. 5, the illustrated I/Os 202 forming the sequence or series are not directed to contiguous or consecutive sequential logical addresses of the same target track of the same target LUN. For example, as illustrated by 244, the sequence of 3 I/Os writes data to LBA 0 (write W0), LBA 2 (write W2) and LBA 255 (write W3), whereby the target locations of the I/Os are not contiguous logical addresses. However, as a variation, it may be that the target locations of the I/Os are contiguous logical addresses. For example, as a variation to that as illustrated by 244, such techniques may also be used in connection with the sequence or series of I/Os to the same target track of the same target LUN whereby the sequence or series of I/Os are also I/Os directed to sequential contiguous logical addresses. For example, referring to FIG. 7, assume the 3 writes of the sequence or series W0, W1 and W2 are as illustrated in the example 400 rather than as illustrated in FIG. 5. In the example 400, the 3 writes in the series or sequence are: W0 that writes to LBA 0; W1 that writes to LBA1 and W2 that writes to LBA 2.

In connection with examples described above, the MP driver 106 is described as performing processing to detect multiple I/O operations directed to the same track on the same LUN whereby the MP driver 106 may search pending I/O queues for multiple I/O operations directed to the same track on the same LUN. As a further optimization to the foregoing, additional information may be available, communicated and/or otherwise known to the MP driver 106 that allows the MP driver 106 to more easily identify particular I/Os as likely or expected candidates directed to the same track on the same LUN. Further, such I/Os may be expected to form a sequential pattern of logically consecutive target addresses. In at least one embodiment, the MP driver may know the host application or process name that generated received I/O operations. The host application or process name sending the I/Os may be communicated to the MP driver in any suitable manner, such as by a parameter provided to the MP driver. For example, a log process of a database application may execute on the host and may issue I/Os received by the MP driver. Such I/Os generated by the log process may be writes to a database log device (e.g., LUN on the data storage system storing the log file(s) used by the database application). Additionally, such write I/Os generated by the log process are expected to be sequential. In this manner, the MP driver receiving write I/Os from the log process may tag such write I/Os with a special I/O tag or hint in the CDB of the write command. In at least one embodiment, the MP driver 106 may examine the write I/Os from the log process and detect a sequential stream or pattern of writes that write to logically consecutive target addresses of the same log LUN. For such writes, the MP driver 106 may from a sequence of writes as described above and additionally embed a LOG tag in the CDBs of the writes. The LOG tag may indicate that the write operation is part of a sequence of multiple writes to sequential logically consecutive target addresses of the same track of the same LUN. For example, with reference back to FIG. 7, the 3 writes to the database log device or LUN may form a detected sequence of consecutive write operations to logically consecutive target addresses of the same track of the same LUN. As such, the MP driver 106 may additionally include the LOG I/O tag in each of the 3 write operation CDBs. The embedding of the LOG I/O tag may be performed, for example, in addition to other processing such as described herein for an I/O sequence. The LOG I/O tag may be included as an additional field in the CDB such as an additional field to those illustrated in FIG. 6A.

Referring to FIG. 8, shown is a flowchart of processing steps that may be performed in an embodiment in accordance with techniques herein. The flowchart 500 outlines steps as just described that may be performed in connection with multiple write commands, applied in order of the sequence, that write to logically consecutive target addresses in the same track of the same target LUN. The flowchart 500 may be performed, for example, in connection with write operation to a database log device as noted above. At step 502, the host MP driver detects multiple write commands forming an I/O sequence directed to the same track of the same target LUN. The multiple write commands, applied in order of the sequence, write to logically consecutive target addresses in the same track of the same target LUN. In step 502, the MP driver has additional knowledge or information associated with received write commands where such additional information denotes the write commands as sent from a particular process or application, such as a process that writes to a database log device or file. Thus, such additional information may be used by the MP driver to further limit or filter the write commands examined for inclusion in the sequence of write commands of step 502. From step 502, control proceeds to step 504 where the MP driver sets the indicator in the CDB to 1 for all but the last write I/O in the sequence, and sets the indicator to 0 for the last write I/O in the sequence. Step 504 is similar to step 354 of FIG. 6B. From step 504, processing proceeds to step 505. In step 505, MP driver embeds a LOG I/O tag in each of the writes of the sequence. From step 505, control proceeds to step 506. In step 506, the MP driver sends all I/Os of the sequence to the same target port of the data storage system. Step 506 is similar to step 356 of FIG. 6B. From step 506, control proceeds to step 508, which is similar to step 358 of FIG. 6B. In step 508, the target port receives the first write of the sequence (e.g., as denoted by the existence of the LOG tag and the indicator of 1), acquires the necessary resources for processing the first write of the sequence and does not release resources after processing the first write. Additionally, the target port receives remaining writes of the sequence (e.g., denoted by the LOG tag in each write to the same track and same target LUN as the first write) and continues to retain/not release the resources for each write of the sequence having an associated CDB with the indicator value of 1. Upon receiving the last I/O of the sequence (e.g., having the LOG tag, the indicator value of 0, and writing to the same track and target LUN as the first write), the target port releases the acquired resources used in processing the last write once processing of the last write has completed. In connection with step 508, it should be noted that although the target port may not explicitly release resources acquired in connection with processing a write of the sequence having the indicator value of 1, prior to servicing the next write of the sequence, the target port may verify/ensure that it still has all necessary required resources for servicing the next received write. The foregoing may be performed since a needed resource may have been relinquished forcibly or through other means that may vary with embodiment.

In efforts to further improve performance associated with the next expected write command of the sequence, the target port may additionally perform processing for the next expected write operation in the sequence even though not yet received by the target port. For example, the target port may acquire any additional resources (e.g., write buffer storage for storing received write data) that are expected to be used in connection with the next expected write operation of the sequence.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   detecting, at a host, a sequence of I/O operations to be sent from the host to a data storage system, wherein each of the I/O operations of the sequence specifies a target address included in a first logical address subrange of a first logical device;
   subsequent to performing said detecting the sequence of I/O operations, sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation;
   receiving the sequence of I/O operations at the same target port of the data storage system; and
   processing the sequence of I/O operations received at the same target port of the data storage system, wherein said processing the sequence of I/O operations received at the same target port of the data storage system includes:
   determining that a first I/O operation of the sequence received at the same target port denotes a start of a new sequence of I/O operations directed to the first logical address subrange of the first logical device, wherein the start of the new sequence of I/O operations is determined when the first I/O operation includes a corresponding indicator that indicates to retain and not release resources used by the same target port in connection with processing the first I/O operation subsequent to completing processing of the first I/O operation, and wherein the first I/O operation is directed to a first target address included in the first logical address subrange of the first logical device and there is currently no detected pending sequence of I/O operations directed to the first logical address subrange of the first logical device; and determining that a last I/O operation of the sequence received at the same target port denotes an end of the new sequence of I/O operations directed to the first logical address subrange of the first logical device, wherein the end of the new sequence of I/O operations is denoted by the last I/O operation including a corresponding indicator that indicates to release resources used by the same target port in connection with processing the last I/O operation subsequent to completing processing of the last I/O operation, and wherein the last I/O operation is directed to a target address included in the first logical address subrange of the first logical device and there is currently a detected pending sequence of I/O operations directed to the first logical address subrange of the first logical device.

2. The method of claim 1, wherein a driver of the host sets the indicator in each of the I/O operations of the sequence and wherein the first logical device is accessible to the host through a plurality of target ports of the data storage system, wherein the same target port is included as one of the plurality of target ports of the data storage system.

3. The method of claim 2, wherein the indicator for each of the I/O operations in the sequence other than a last one of the I/O operations of the sequence indicates to retain and not release resources used by the same target port in connection with processing said each I/O operation subsequent to completing processing of said each I/O operation.

4. The method of claim 3, wherein the indicator of the last one of the I/O operations of the sequence indicates to release resources used by the same target port in connection with processing the last one of the I/O operations subsequent to completing processing of the last one of the I/O operations of the sequence.

5. The method of claim 1, wherein the first logical address subrange corresponds to a track including a plurality of blocks of data stored on the first logical device.

6. The method of claim 1, wherein each I/O operation of the sequence is a write operation and the sequence of write operations writes to consecutive sequential logical addresses of the first logical address subrange.

7. The method of claim 6, wherein each of the write operations of the sequence includes an I/O tag denoting that said each write operation is included in a write sequence of multiple write operations that write to consecutive sequential logical addresses of the first logical address subrange.

8. The method of claim 7, wherein a driver of the host sets the indicator and the I/O tag in each of the I/O operations of the sequence and wherein the first logical device is accessible to the host through a plurality of target ports of the data storage system, the plurality of target ports including the same target port.

9. The method of claim 1, wherein the I/O operations of the sequence are not directed to consecutive sequential logical addresses of the first logical address subrange.

10. The method of claim 1, wherein the sequence includes at least one read operation and at least one write operation.

11. The method of claim 1, wherein the sequence includes only write operations.

12. The method of claim 1, wherein the sequence includes only read operations.

13. The method of claim 1, wherein the first logical device includes a second logical address subrange of a logical address space of the first logical device, and the first logical address subrange and the second logical address subrange are contiguous and consecutive logical address subranges of the first logical device, and the method includes:

issuing, by an application on the host, an I/O operation having a target address range that includes one or more logical addresses of the first logical address subrange and one or more logical addresses of the second logical address subrange;

partitioning the I/O operation into a first I/O operation and a second I/O operation, wherein the first I/O operation is directed to the one or more logical addresses of the first logical address subrange and the second I/O operation is directed to the one or more logical addresses of the second logical address subrange, wherein the first I/O operation is included in the sequence of I/O operations; and sending, from the host, a second sequence of I/O operations to a second target port of the data storage system, wherein each of the I/O operations of the second sequence includes an indicator denoting whether resources used by the second target port in connection with processing said each I/O operation are to be released subsequent to completing processing of said each I/O operation, wherein each I/O operation of the second sequence is directed to a target address in the second logical address subrange.

14. A system comprising:
one or more processors; and
a memory comprising code stored thereon that, when executed by at least a first of the one or more processors, performs a method of processing I/O operations comprising:

detecting, at a host, a sequence of I/O operations to be sent from the host to a data storage system, wherein each of the I/O operations of the sequence specifies a target address included in a first logical address subrange of a first logical device;

subsequent to performing said detecting the sequence of I/O operations, sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation;

receiving the sequence of I/O operations at the same target port of the data storage system; and processing the sequence of I/O operations received at the same target port of the data storage system, wherein said processing the sequence of I/O operations received at the same target port of the data storage system includes:

determining that a first I/O operation of the sequence received at the same target port denotes a start of a new sequence of I/O operations directed to the first logical address subrange of the first logical device, wherein the start of the new sequence of I/O operations is determined when the first I/O operation includes a corresponding indicator that indicates to retain and not release resources used by the same target port in connection with processing the first I/O operation subsequent to completing processing of the first I/O operation, and wherein the first I/O operation is directed to a first target address included in the first logical address subrange of the first logical device and there is currently no detected pending sequence of I/O operations directed to the first logical address subrange of the first logical device; and determining that a last I/O operation of the sequence received at the same target port denotes an end of the new sequence of I/O operations directed to the first logical address subrange of the first logical device, wherein the end of the new sequence of I/O operations is denoted by the last I/O operation including a corresponding indicator that indicates to release resources used by the same target port in connection with processing the last I/O operation subsequent to completing processing of the last I/O operation, and wherein the last I/O operation is directed to a target address included in the first logical address subrange of the first logical device and there is currently a detected pending sequence of I/O operations directed to the first logical address subrange of the first logical device.

15. A non-transitory computer readable medium comprising code stored thereon that, when executed, performs a method of processing I/O operations comprising:

detecting, at a host, a sequence of I/O operations to be sent from the host to a data storage system, wherein each of the I/O operations of the sequence specifies a target address included in a first logical address subrange of a first logical device;

subsequent to performing said detecting the sequence of I/O operations, sending, from the host, the sequence of I/O operations to a same target port of the data storage system, wherein each of the I/O operations of the sequence includes an indicator denoting whether resources used by the same target port in connection with processing said each I/O operation are to be released subsequent to completing processing of said each I/O operation;

receiving the sequence of I/O operations at the same target port of the data storage system; and processing the sequence of I/O operations received at the same target port of the data storage system, wherein said processing the sequence of I/O operations received at the same target port of the data storage system includes:

determining that a first I/O operation of the sequence received at the same target port denotes a start of a new sequence of I/O operations directed to the first logical address subrange of the first logical device, wherein the start of the new sequence of I/O operations is determined when the first I/O operation includes a corresponding indicator that indicates to retain and not release resources used by the same target port in connection with processing the first I/O operation subsequent to completing processing of the first I/O operation, and wherein the first I/O operation is directed to a first target address included in the first logical address subrange of the first logical device and there is currently no detected pending sequence of I/O operations directed to the first logical address subrange of the first logical device; and determining that a last I/O operation of the sequence received at the same target port denotes an end of the new sequence of I/O operations directed to the first logical address subrange of the first logical device, wherein the end of the new sequence of I/O operations is denoted by the last I/O operation including a corresponding indicator that indicates to release resources used by the same target port in connection with processing the last I/O operation subsequent to completing processing of the last I/O operation, and wherein the last I/O operation is directed to a target address included in the first logical address subrange of the first logical device and there is currently a detected pending sequence of I/O operations directed to the first logical address subrange of the first logical device.

16. The non-transitory computer readable medium of claim 15, wherein a driver of the host sets the indicator in each of the I/O operations of the sequence and wherein the first logical device is accessible to the host through a plurality of target ports of the data storage system, wherein the same target port is included as one of the plurality of target ports of the data storage system.

17. The non-transitory computer readable medium of claim 16, wherein the indicator for each of the I/O operations in the sequence other than a last one of the I/O operations of the sequence indicates to retain and not release resources used by the same target port in connection with processing said each I/O operation subsequent to completing processing of said each I/O operation and wherein the indicator of the last one of the I/O operations of the sequence indicates to release resources used by the same target port in connection with processing the last one of the I/O operations subsequent to completing processing of the last one of the I/O operations of the sequence.

* * * * *